United States Patent
Stefan et al.

(10) Patent No.: US 11,590,964 B2
(45) Date of Patent: Feb. 28, 2023

(54) METHOD FOR PERFORMING AUTOMATIC VALET PARKING

(71) Applicant: Ford Global Technologies, LLC, Dearborn, MI (US)

(72) Inventors: Frederic Stefan, Aachen (DE); Michael Marbaix, Whitby (CA); Evangelos Bitsanis, Aachen (DE); Turgay Aslandere, Aachen (DE); Alain Chevalier, Henri-Chapelle (BE)

(73) Assignee: Ford Global Technologies, LLC, Dearborn, MI (US)

( * ) Notice: Subject to any disclaimer, the term of this patent is extended or adjusted under 35 U.S.C. 154(b) by 176 days.

(21) Appl. No.: 17/003,987

(22) Filed: Aug. 26, 2020

(65) Prior Publication Data
US 2021/0061264 A1   Mar. 4, 2021

(30) Foreign Application Priority Data
Aug. 27, 2019  (DE) .......................... 102019212791.6

(51) Int. Cl.
*B60W 30/06* (2006.01)
*B60W 60/00* (2020.01)
(Continued)

(52) U.S. Cl.
CPC ............ *B60W 30/06* (2013.01); *B60W 50/14* (2013.01); *B60W 60/001* (2020.02);
(Continued)

(58) Field of Classification Search
CPC ............ B60W 30/06; B60W 60/0011; B60W 60/0018; B60W 60/00184;
(Continued)

(56) References Cited

U.S. PATENT DOCUMENTS

| | | | | |
|---|---|---|---|---|
| 9,522,675 | B1 * | 12/2016 | You ...................... | B60W 30/06 |
| 2009/0187340 | A1 * | 7/2009 | Vavrus .................. | G08G 1/146 |
| | | | | 701/414 |
| 2014/0266800 | A1 * | 9/2014 | Koukoumidis ........ | G08G 1/146 |
| | | | | 340/932.2 |
| 2015/0344028 | A1 * | 12/2015 | Gieseke ................ | B60W 30/06 |
| | | | | 701/1 |

(Continued)

FOREIGN PATENT DOCUMENTS

| | | | | |
|---|---|---|---|---|
| CN | 105799711 A | * | 7/2016 | ........... B60W 10/04 |
| DE | 10 2004 033 078 A1 | | 1/2006 | |

(Continued)

*Primary Examiner* — Dale W Hilgendorf
(74) *Attorney, Agent, or Firm* — Frank Lollo; Eversheds Sutherland (US) LLP (57) ABSTRACT

A method for performing automatic valet parking, which includes selecting a road scenario applicable to a roadway; notifying a driver to release manual control elements of a motor vehicle and to leave the motor vehicle; checking whether the control elements have been released and the driver has left the motor vehicle and, in this case, entering an EXPLORE mode in which the motor vehicle is slowly driven autonomously and searches for a free car space or a parking space using the vehicle's own environmental sensors, before the motor vehicle is placed in a parking position; and then to change from the EXPLORE mode to a PARKING mode in which the motor vehicle is parked in the car space or in the parking space from the parking position by means of the longitudinal and lateral controllers and using the environmental data previously obtained from the environmental sensors in the EXPLORE mode.

10 Claims, 5 Drawing Sheets

(51) Int. Cl.
  *G08G 1/14*     (2006.01)
  *B60W 50/14*    (2020.01)
  *B60W 50/02*    (2012.01)
(52) U.S. Cl.
  CPC .... *B60W 60/0011* (2020.02); *B60W 60/0018* (2020.02); *B60W 60/0025* (2020.02); *B60W 60/0051* (2020.02); *B60W 60/00184* (2020.02); *G08G 1/143* (2013.01); *B60W 50/02* (2013.01)
(58) Field of Classification Search
  CPC .......... B60W 60/0025; B60W 60/001; B60W 60/0051; B60W 50/14; B60W 50/02; G08G 1/143
  See application file for complete search history.

(56) References Cited

U.S. PATENT DOCUMENTS

| | | | |
|---|---|---|---|
| 2017/0129485 A1* | 5/2017 | Seo | B62D 15/0285 |
| 2018/0037262 A1* | 2/2018 | Imai | B60W 30/06 |
| 2018/0075744 A1* | 3/2018 | Seo | G08G 1/146 |
| 2018/0319327 A1* | 11/2018 | Cunningham, III | G08G 1/143 |
| 2019/0031239 A1* | 1/2019 | Nakamura | B60W 30/06 |
| 2019/0039606 A1* | 2/2019 | Fujita | B60W 30/06 |
| 2019/0308616 A1* | 10/2019 | Jie | B60W 30/06 |
| 2020/0290598 A1* | 9/2020 | Shoda | B60W 30/06 |

FOREIGN PATENT DOCUMENTS

| | | |
|---|---|---|
| DE | 10 2016 206 757 A1 | 11/2016 |
| DE | 10 2015 222 934 A1 | 5/2017 |

\* cited by examiner

METHOD FOR PERFORMING AUTOMATIC VALET PARKING

CROSS-REFERENCE TO RELATED APPLICATIONS

The disclosure claims priority to and the benefit of German Application No. 102019212791.6, filed Aug. 27, 2019, which is hereby incorporated by reference herein in its entirety.

FIELD

The invention relates to a method and a motor vehicle for performing automatic valet parking (AVP) on and/or beside a roadway, namely a public road or a roadway on a site or in a building with parking spaces for motor vehicles.

BACKGROUND

Automated motor vehicle parking assistants are always acquiring new capabilities. Parking steering assistants are able to take on the lateral control of the vehicle while the driver controls the powertrain. With the next generation of parking assistants, for example the so-called advanced automated parking assistance, the system is able to take on the lateral and longitudinal control of the vehicle, wherein the driver sitting in the car still has to monitor the surroundings.

DE 10 2014 221 920 A1 discloses a parking assistant for automatically carrying out a parking operation after a driver has parked and exited his vehicle in a suitable position near a parking space he/she identified or a free car space. Environmental sensors of the vehicle monitor the vehicle environment, wherein setting values or setpoints for longitudinal control (by means of drive, brake actuation and gear change lever position) and lateral control (by means of steering) are generated. These setting values are stored in chronological order during the maneuvering process to allow an automatic exit of a vehicle position during the maneuvering process on the basis of the stored setpoints, wherein the setting values are retrieved in reverse order.

DE 10 2016 206 757 A1 discloses a parking assistant which also supports the search for a free parking space by having a so-called search or exploration phase before actually parking, in which a parking space suitable for parking the vehicle is detected with sensor assistance and proposed to the driver. After that, the vehicle can park autonomously.

The above-mentioned parking assistants require a certain level of control and monitoring by the driver.

The next generation of parking assistants is an assistant for so-called automated valet parking or automatic valet parking (AVP), in which a driver can, for example, get out at a drop-off point in front of a parking area such as an underground car park, a car park or any parking site, and then, after activation by the driver, the vehicle drives autonomously to a free car space or a parking space and parks there. Conversely, the driver can have his/her parked vehicle returned to the drop-off point.

For example, such an AVP assistant is mentioned in DE 10 2015 208 068 A1. It requires a parking system with an infrastructure which contains elements designed for good detectability by the vehicle's own sensors. Also, with other well-known AVP assistants, the parking area must also have a dedicated infrastructure, which includes a digital parking map and/or localization sensors distributed throughout, for example.

In the context of so-called autonomous driving, automatic valet parking is to be classified as autonomous driving at a relatively low autonomy level. However, more complex situations on roadways with many adjacent parking spaces require more complex parking area infrastructures or/and higher levels of autonomy, wherein the latter are both difficult to implement from both a technical and a legal point of view.

SUMMARY

The invention is based on the object of proposing a method and a motor vehicle for automatic valet parking (AVP), which are able to operate in a standalone mode, i.e. without a driver in the vehicle, with relatively little cost in the vehicle and without additional parking assistance infrastructures outside the vehicle.

This object is achieved by a method and a motor vehicle with the features of the independent claims.

Advantageous further developments of the invention are indicated in the dependent claims. According to the invention, the method includes the steps, after activation by the driver of a motor vehicle, to select a road scenario applicable to the roadway from multiple pre-set scenarios or to have them selected by the driver, wherein the preset scenarios include at least the parking area layouts longitudinal parking, vertical parking and cross-parking; to check whether a road scenario has been selected; to notify the driver to release manual control elements of the vehicle and to leave the vehicle; to check whether the controls have been released and the driver has left the vehicle; when the control elements are released and the driver has left the vehicle to enter an EXPLORE mode in which the motor vehicle slowly drives autonomously along the roadway by using longitudinal and lateral controllers 4, 5 and searches for a free car space or a parking space using only the vehicle's own environmental sensors, which are in particular LIDAR, RADAR and/or ultrasonic sensors; when a free car space or a parking space of sufficient size for the motor vehicle has been found, to bring the motor vehicle into a parking position suitable for parking and to stop there; when the motor vehicle has reached the appropriate position for parking, to switch from the EXPLORE mode to a PARKING mode in which the motor vehicle is parked autonomously from the parking position in the car space or in the parking space by means of the longitudinal and lateral controllers, using only the environmental data of the environment sensors previously obtained in the EXPLORE mode and the environmental data continuously captured in the PARKING mode.

With the invention, a driver can stop on a road with adjacent parking spaces in any particular arrangement (parallel, vertical, oblique), can activate the AVP system and can leave the vehicle. The motor vehicle then begins to locate a suitable free car space or parking space, wherein it only relies on LIDAR/RADAR sensors, possibly in combination with ultrasonic sensors, and when it has found a free car space or a parking space, it takes up a suitable parking position and maneuvers into it, thus ending the procedure.

The invention provides a simple method for performing automatic valet parking, which, among other things, enables parallel parking on public roads without additional parking assistance infrastructures outside the vehicle. The method is based on areas monitored solely by means of the vehicle sensors (LIDAR, RADAR, etc.), the size of which can be dynamically changed, as well as on a longitudinal controller, a transverse controller, a trajectory planning unit and a planning and arbitration logic.

While the AVP system is active, different pause and abort modes can be activated when obstacles occur in certain areas around the vehicle during different phases of the maneuver. The use of the AVP system is only proposed to the driver if the vehicle components required for this are working error-free.

Before activating the AVP system, the AVP system and/or the driver should also be sure that there is at least one free and preferably cost-free car space or parking space on the road or on the parking area. The person skilled in the art knows options for how this can be achieved.

In preferred embodiments, the motor vehicle is driven slowly and autonomously along the roadway in the EXPLORE mode with constant but gradually reduced speed. Preferably, the motor vehicle is initially driven along the roadway at a constant speed of approx. 10 km/h and in further phases of the EXPLORE mode gradually at lower speeds than approx. 10 km/h, in particular approx. 8 km/h and then approx. 6 km/h.

In the PARKING mode, the motor vehicle is preferably driven at significantly lower speeds than in the EXPLORE mode and in particular at approx. 2 km/h.

In preferred embodiments, four areas around the motor vehicle are monitored by means of the environmental sensors, wherein the size of the monitored areas is gradually reduced and, in particular, gradually reduced as the speed decreases. The four areas are preferably a first area straight ahead of the motor vehicle, a second area in front to the right (when parking on the right) or in front to the left (when parking on the left) of the motor vehicle, a third area extending over the length of a whole side of the motor vehicle, and a fourth area extending over part of the length of a side of the motor vehicle and extending further to the side than the third area.

In preferred embodiments, the signals of the environmental sensors are evaluated by four monitoring units, each of which is assigned to one of the four areas and obtains information from the signals about whether there is an obstacle in the assigned areas or not, and how large the distance from this obstacle is, if any, in particular as a longitudinal distance and a lateral distance.

In preferred embodiments, the method is carried out without a parking assistance infrastructure outside of the vehicle or on the roadway (with elements adapted to motor vehicle environment sensors) and without prior knowledge of paths to a car space or a parking space, wherein at least the EXPLORE and PARKING modes can be carried out without supervision by a person.

In preferred embodiments, under certain conditions the method enters a PAUSE mode or AN ABORT mode, from which the method can independently return to the EXPLORE or PARKING mode, and under certain conditions from each of the above operating modes enters a FAULT mode in which the motor vehicle immediately stops and at least the driver is notified of the event.

BRIEF DESCRIPTION OF THE DRAWINGS

A description exemplary embodiments based on the drawings follows. In the figures.

DETAILED DESCRIPTION

Figures 1, 3:
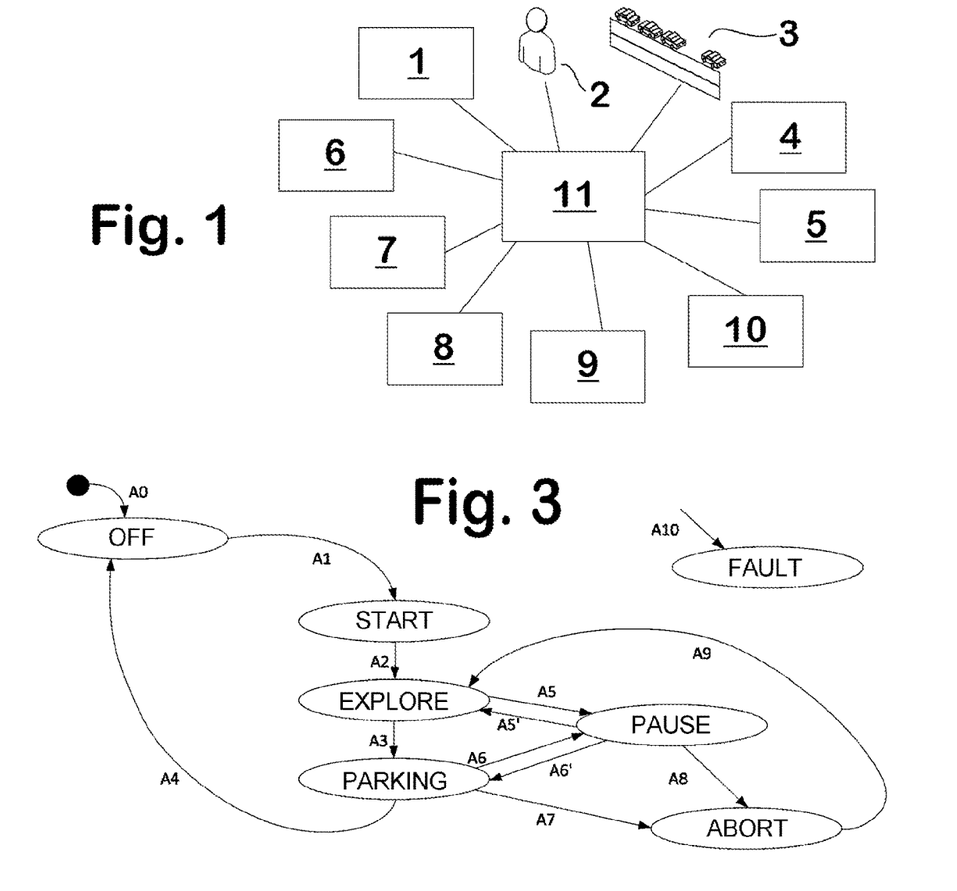
FIG. 1 shows an overview of an AVP system.
FIG. 3 shows modes of operation of the AVP system and possible transitions between them.

In the overview of the proposed AVP system shown in FIG. 1, Block 1 illustrates a self-driving or autonomous motor vehicle that can drive, steer and park without the influence of a human driver. For this purpose, the vehicle 1 can perceive its surroundings with the help of various environmental sensors such as LIDAR, RADAR and/or ultrasonic sensors and can determine its position and that of other road users from the information obtained. The vehicle 1 has so-called "drive-by-wire" for driving and steering without mechanical power transmission from control elements, such as pedals and steering wheel, to corresponding final control elements, such as throttle valves, brakes and steering, which are instead controlled via electrical cables and servo motors or electromechanical actuators. In cooperation with a navigation system, vehicle 1 can autonomously head for a driving destination and can avoid collisions along the way. The vehicle 1 can be a conventional vehicle with an internal combustion engine and an automatic transmission or any HEV/BEV (Hybrid Electric Vehicle/Battery Electric Vehicle) vehicle, for example. The vehicle 1 is set up to carry out the AVP method described herein, and the necessary hardware and software components form a corresponding apparatus.

The reference character 2 denotes an owner or a driver of the vehicle 1 who can activate the AVP system and select one of multiple preset road scenarios 3. The road scenarios 3 indicate for which types of parking scenarios for a road or other driving and parking area the AVP system can offer a parking strategy.

The road scenario 3 can be selected by the driver 2 before he/she leaves the vehicle 1. Alternatively, the locally applicable road scenario 3 can also be supplied to the vehicle 1 via a traffic network (so-called V2X) from another vehicle, a central server, or an infrastructure. The road scenarios 3 can also include predefined parking area information such as parallel, vertical, inclined parking and also (for example with a 3D editor) individually prepared parking layouts.

Block 4 illustrates a vehicle longitudinal controller that essentially controls the speed of the vehicle 1 based on a speed setting value or a speed setpoint provided by a core logic 11. The control signals are, for example, a virtual accelerator pedal position and a virtual brake pedal position. A PI (Proportional-Integral) controller can be used for this purpose.

Block 5 illustrates a vehicle lateral controller, which essentially controls the lateral distance of the vehicle 1 from lateral obstacles based on a lateral separation setting value or setpoint, which is also provided by the core logic 11. In addition, the lateral controller 5 contains a lateral anomaly correction logic, which makes it possible to monitor a third-party vehicle which is parked in an incorrect orientation using the inputs into a monitoring unit 9. For example, the control signal for the lateral controller 5 is a virtual steering angle position. For this purpose, a control unit can be used, which is combined with logic for a so-called leaky bucket algorithm, which handles incorrectly oriented obstacles.

Block 6 illustrates a first front monitoring unit for monitoring an area in front of the vehicle 1, consisting of at least one set of sensors (for example LIDAR, RADAR, ultrasound) for at least one area 6a to be monitored. The first front monitoring unit 6 detects the presence of an obstacle ahead, such as a pedestrian crossing the road in front of the vehicle 1.

Block 7 illustrates a second front right monitoring unit in the front right corner of the vehicle 1, consisting of at least one set of sensors (for example LIDAR, RADAR, ultrasound) for at least one area 7a to be monitored. The second front right monitoring unit 7 detects the presence of a front right obstacle, such as a wrongly parked third-party vehicle, and allows the vehicle 1 to correct its lateral orientation if there are anomalies.

Block 8 illustrates a third lateral monitoring unit for the entire side of the vehicle 1 facing away from the road, consisting of at least one set of sensors (for example LIDAR, RADAR, ultrasound) for at least one area 8a to be monitored. The third lateral monitoring unit 8 detects the presence of a free car space or a parking space, i.e. an area large enough to place the vehicle 1 on.

Block 9 illustrates a fourth front lateral monitoring unit for a front part of the side of the vehicle 1 facing away from the road, consisting of at least one set of sensors (for example LIDAR, RADAR, ultrasound) for at least one area 9a to be monitored. This unit detects the presence of and distance from a lateral obstacle, such as a parked third-party vehicle, trees, etc., and allows vehicle 1 to control its lateral orientation.

Figure 2:
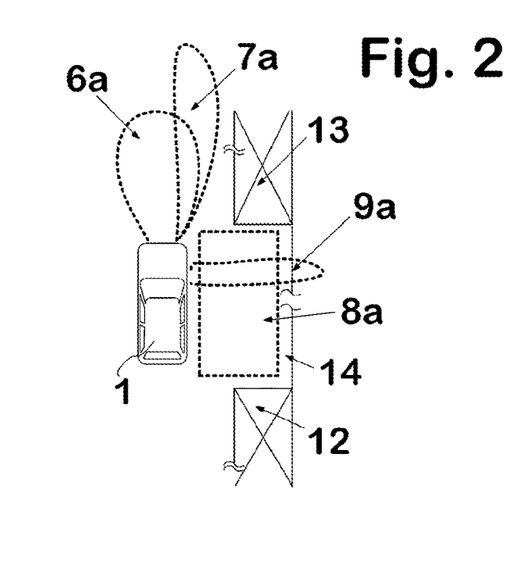
FIG. 2 shows a top view of a motor vehicle equipped with the AVP system on a road with parking options and the areas monitored by it.

The locations of the monitoring units 6 to 9 on the vehicle 1 and the areas 6a to 9a monitored thereby are illustrated in FIG. 2. Note that the different monitoring units 6 to 9 can share the same physical sensors and that the areas 6a to 9a monitored by individual sensors or monitoring units 6 to 9 can overlap. Another feature of the monitoring units 6 to 9 is that they can jointly provide at least the information or measurements as to whether or not there is an obstacle in the areas 6a to 9a monitored by them, i.e. the size of the distance to that obstacle, a lateral distance to that obstacle, a longitudinal distance to that obstacle, etc.

Block 10 denotes a road where on which a vehicle can be parked and stopped briefly to drop off a passenger. On the edge of the road, besides immovable objects such as trees, there are in particular other parked vehicles, which can be used by the vehicle 1 to control its lateral orientation.

Block 11 illustrates the core logic. Operating modes of the core logic with which the core logic 11 coordinates the AVP system are illustrated in FIG. 3 and are explained below.

In the exemplary embodiment, different parameter values are assigned to the four monitoring units 6 to 9. These parameter values can be inter alia:
- depending on at least one vehicle parameter (for example speed),
- depending on the chosen road scenario 3,
- a constant value,
- a lookup table,
- the result of preprocessing (offline function),
- the result of online processing (online function), and/or
- a geometrical shape with certain dimensions.

The operating modes are the following and give the following instructions to the AVP system:
OFF: Disable all activation requests to the monitoring units 6 to 9 and longitudinal and lateral controllers 4 to 5.

Start:
Make sure that at least one car space or parking space is available anywhere around the vehicle 1, i.e. within a certain radius around the vehicle 1.
Notify the driver 2 to select a road scenario 3 or request a road scenario 3 from the infrastructure.
Notify the driver 2 to release all manual actuators (steering, brakes, accelerator pedal) and to place the selector lever of an automatic transmission in the parking position P.
Notify driver 2 to leave the vehicle 1.
Check whether the driver 2 has responded to all notifications and has left the vehicle.
Set the wheel steering angle (for example to zero)
Explore:
In contrast to fully supported parking aids or improved parking assistance features or remote-controlled parking, there is no driver 2 in the vehicle 1 or monitoring the vehicle 1 from the outside, but the AVP system alone takes care of the exploration of the surroundings.

FIG. 2 illustrates a situation in which the vehicle 1 in the EXPLORE mode slowly drives along a road, at the edge of which there are a first obstacle 12 and a second obstacle 13, which are, for example, parked third-party vehicles. Using the monitoring units 6 to 9, the AVP system can detect that all monitored areas 6a to 9a are free of obstacles and that, in particular, both in front of and next to the vehicle 1, there is sufficient space for the vehicle 1 to autonomously maneuver in an area 14 between the obstacles 12 and 13, which represents a free car space or a parking space. Forward monitoring is necessary because an obstacle in front of the vehicle 1 would make it impossible to park in reverse, as is required for a relatively small distance between the obstacles 12 and 13.

Figure 4A:
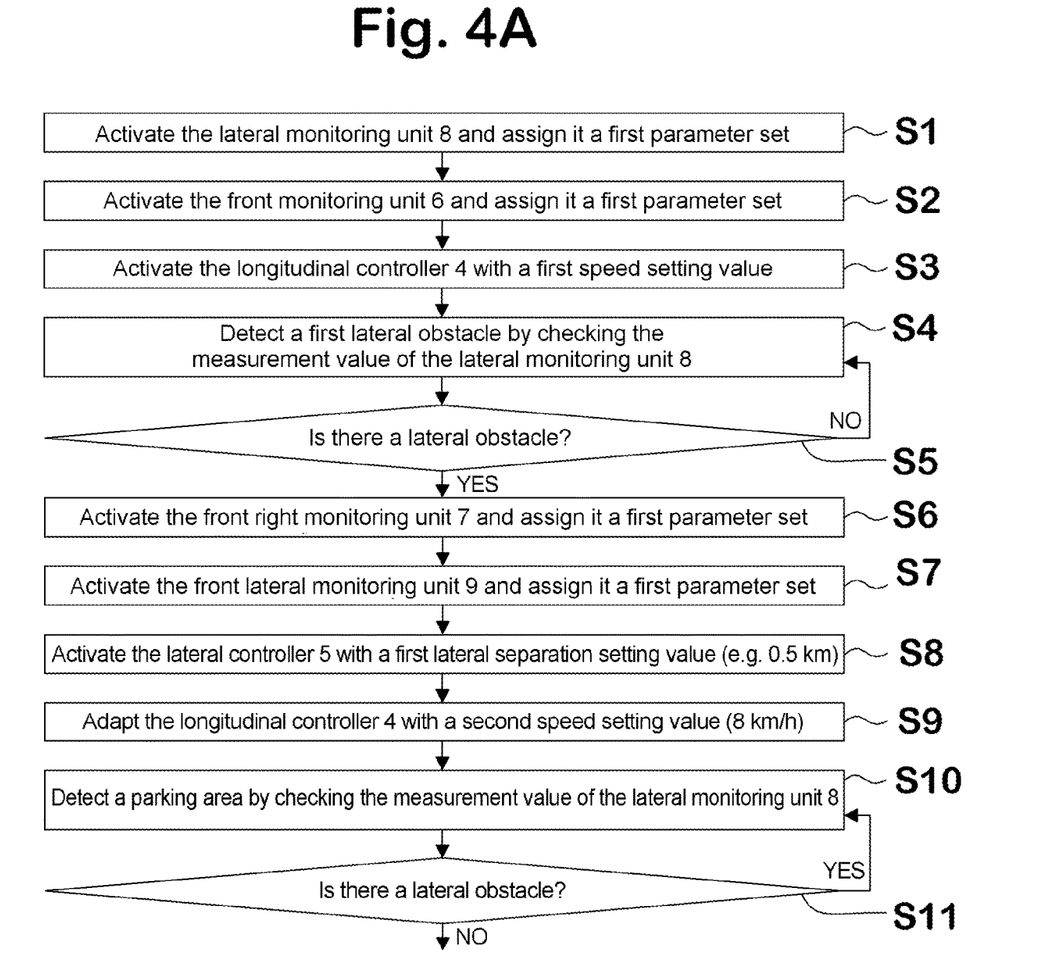
FIGS. 4A and 4B show steps of the method of the EXPLORE mode.
Figure 4B:
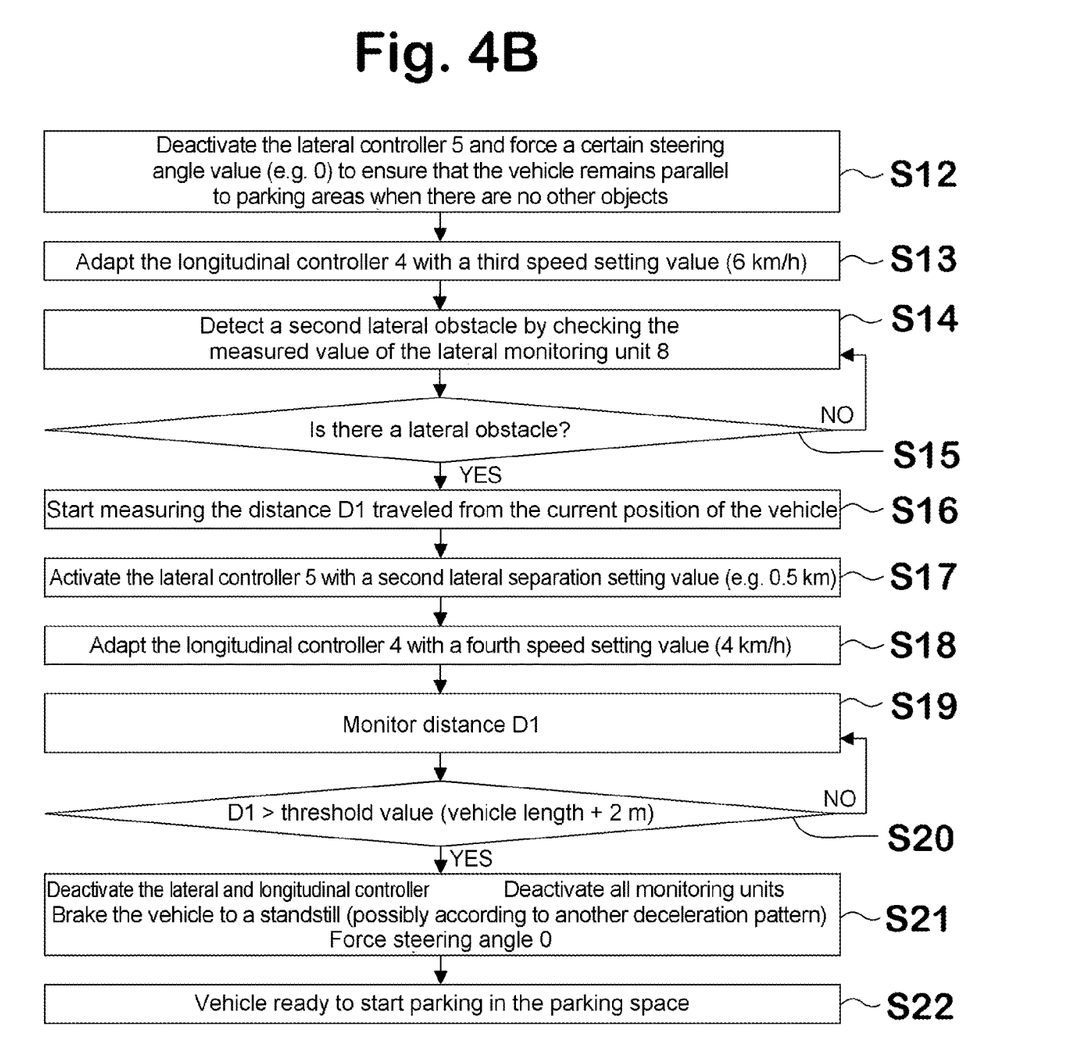

FIGS. 4A and 4B show steps of the method which the core logic 11 performs by means of the longitudinal and lateral controllers 4 to 5 and the monitoring units 6 to 9 in the EXPLORE mode, without the driver 2, who has left the vehicle 1, still having to act in a controlling or monitoring mode.

In step S1, the lateral monitoring unit 8 is activated and a first parameter set is assigned to it.

In step S2, the front monitoring unit 6 is activated and a first parameter set is assigned to it.

In step S3, the longitudinal controller 4 is activated with a first exploring speed setting value (10 km/h).

In step S4, the measured value of the lateral monitoring unit 8 is monitored to detect a first lateral obstacle.

As long as it is determined in step S5 that there is no lateral obstacle, it returns to step S4. If it is determined in step S5 that there is a lateral obstacle, it continues to step S6.

In step S6, the front right monitoring unit 7 is activated and a first parameter set is assigned to it.

In step S7, the front lateral monitoring unit 9 is activated and a first parameter set is assigned to it.

In step S8, the lateral controller 5 is activated with a first lateral separation setting value (for example 0.5 m).

In step S9, the longitudinal controller 4 is adapted with a second exploring speed setting value (for example 8 km/h).

In step S10, the measured value of the lateral monitoring unit 8 is monitored in order to detect a free parking area.

As long as it is determined in step S11 that there is a lateral obstacle, it returns to step S10. If it is determined in step S11 that there is no lateral obstacle, it continues to step S12.

In step S12, the lateral controller 5 is activated and a certain steering angle value (for example zero) is enforced to ensure that the vehicle 1 remains parallel to parking areas when no other objects are present.

In step S13, the longitudinal controller 4 is adapted with a third exploring speed setting value (for example 6 km/h).

In step S14, the measured value of the lateral monitoring unit 8 is monitored to detect a second lateral obstacle.

As long it is determined in step S15 that there is no lateral obstacle, it returns to step S14. If it is determined in S15 that there is a lateral obstacle, it continues to step S16.

In step S16 measurement of the distance D1 travelled from the current position of the vehicle 1 is started.

In step S17, the lateral controller 5 is activated with a second lateral separation setting value (for example 0.5 m).

In step S18, the longitudinal controller 4 is adapted with a fourth exploring speed setting value (4 km/h).

In step S19, the distance D1 is monitored.

As long as it is determined in step S20 that the distance D1 is less than a threshold value (for example vehicle length+2 m), it returns to step S19. If it is determined in step S20 that the distance D1 is greater than or equal to the threshold value (for example vehicle length+2 m), it continues to step S21.

In step S21, the lateral and longitudinal controllers are deactivated, all monitoring units are deactivated, the vehicle 1 is braked to a standstill, possibly according to another deceleration pattern, and a zero steering angle is forced.

In step S22, the vehicle 1 is ready to start parking in the parking space.

As an alternative to detecting a second lateral obstacle, a virtual obstacle could be automatically detected when the vehicle 1 has travelled a certain distance without detecting an obstacle, which makes it possible to take advantage of parking spaces.

Since the exploration is done by software, the final position of the vehicle 1 (i.e. ready to park) is almost identical in any parking situation. Changes from parking situation to parking situation for parking will be of little importance, and this can facilitate trajectory planning in the PARKING mode.

Parking:

The monitored distances D1, D2, D3 are signed, which means that when the vehicle moves forward, the distance becomes larger and smaller when reversing. This makes it easy to reverse tables or maps for trajectories and setting values.

Since the EXPLORE mode ensures fairly reproducible positioning of the vehicle in front of the parking space, trajectory planning in the PARKING mode can be kept simple and reduced to two phases, namely a first maneuver in reverse into the parking space and a second maneuver forwards to recenter the position of the vehicle in relation to the parking space.

During the PARKING mode, the monitoring units monitor areas with a risk of collision, in particular a preferably rectangular area with variable (for example depending on the parking speed) length behind the vehicle and an area along the side of the vehicle which enters the parking space first and where the vehicle could encounter obstacles such as pedestrians. For example, the area along the side of the vehicle is a rectangular area that extends along the entire length of the vehicle but is relatively narrow, such as ⅓ of the vehicle width, wherein this width may also be variable, such as larger, as long as the vehicle is counter-steered.

For example, the various control parameters (including the areas to be monitored in the PARKING mode) of the monitoring units 6, 7, 8 and the longitudinal and lateral controllers 4, S may be specified in one or more lookup tables with respect to the relative distance travelled. For example, these parameters can be processed as follows:

Through manual training in a virtual test environment.
Through machine learning.
Through geometrical functions.
Through optimization criteria (for example ensuring a safety margin to surrounding obstacles).
By continuously monitoring the longitudinal and lateral direction of the vehicle to avoid collisions.

Figure 5A:
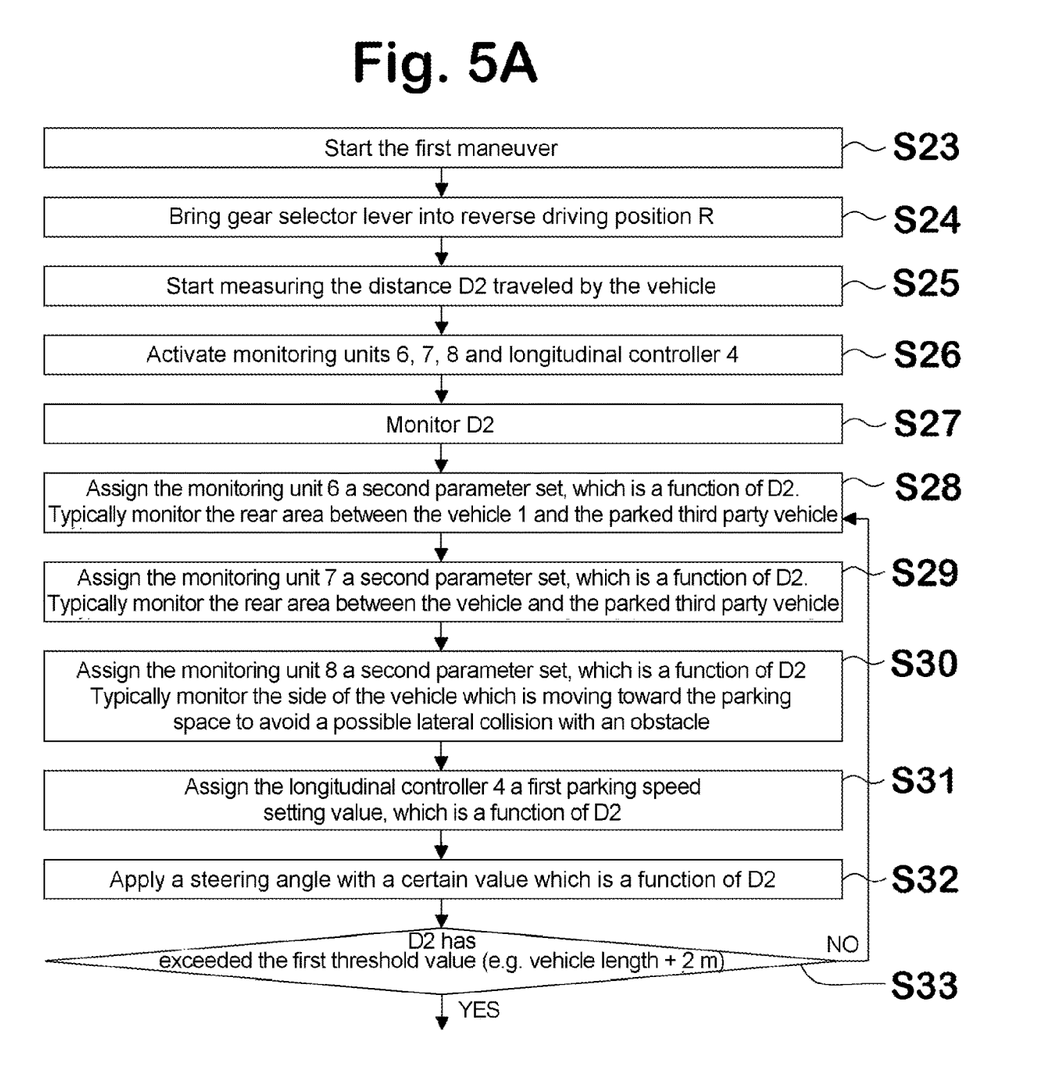
FIGS. 5A and 5B show steps of the method of the PARKING mode.
Figure 5B:
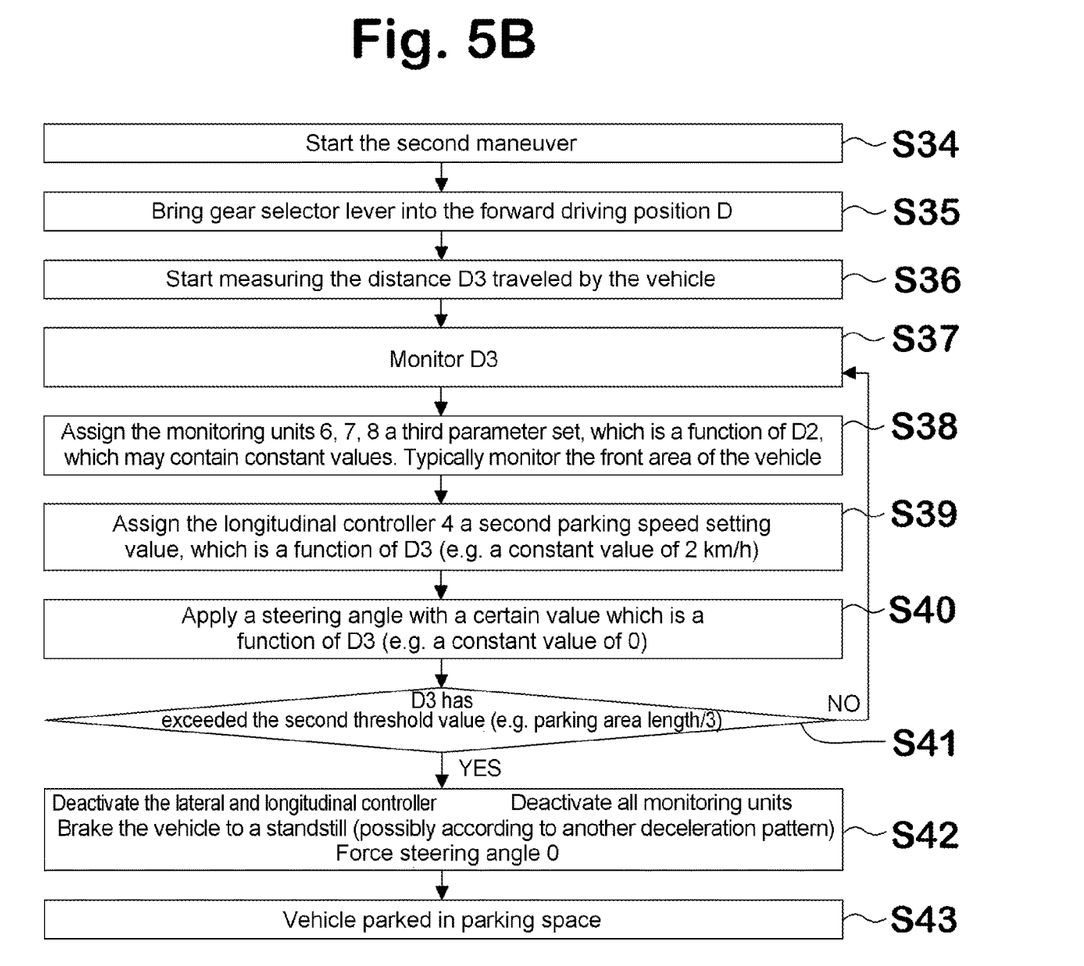

FIGS. 5A and 5B show steps of the method, which the core logic 11 performs in the PARKING mode by means of the longitudinal and lateral controllers 4 to S and the monitoring units 6 to 9.

In step S23, a first maneuver is started. For this purpose, the gear selector lever is placed in the reversing position R in step S24. In step S25, measurement of the distance D2 travelled by the vehicle 1 is started. In step S26, the monitoring units 6, 7, 8 and the longitudinal controller 4 are activated. In step S27, the distance D2 is monitored.

In step S28, a second parameter set which is a function of distance D2 is assigned to the monitoring unit 6. Typically, the rear area between the vehicle 1 and the parked third-party vehicle is monitored.

In step S29, a second parameter set which is a function of the distance D2 is assigned to the monitoring unit 7. Typically, the rear area between the vehicle 1 and the parked third-party vehicle is monitored.

In step S30, a second parameter set which is a function of the distance D2 is assigned to the monitoring unit 8. Typically, the side of the vehicle 1 that moves towards the parking space is monitored to prevent a possible lateral collision with an obstacle.

In step S31, a first parking speed setting value which is a function of the distance D2 is assigned to the longitudinal controller 4.

In step S32, a steering angle with a specific value which is a function of the distance D2 is applied.

In step S33, it is checked whether the distance D2 has exceeded a first threshold value (for example vehicle length+2 m). If not, it returns to step S28.

If the distance D2 has exceeded the first threshold value, a second maneuver is started in step S34. For this purpose, the gear selector lever is placed in the forward driving position D in step S35. In step S36, measurement of the distance D3 travelled by the vehicle 1 is started. In step S37, the distance D3 is monitored.

In step S38, a parameter set that can contain constant values is assigned to the monitoring units 6, 7, 8. Typically, the front area of the vehicle 1 is monitored.

In step S39, a second parking speed setting value which is a function of the distance D3 (for example a constant value of 2 km/h) is assigned to the longitudinal controller 4.

In step S40 a steering angle with a specific value that is a function of the distance D3 (for example, a constant value of zero) is applied.

In step S41, it is checked whether the distance D3 has exceeded a second threshold value (for example parking area length/3). If not, it returns to step S37.

If the distance D3 has exceeded the second threshold value, in step S42 the lateral and longitudinal controllers are deactivated, all monitoring units are deactivated, the vehicle 1 is braked to a standstill, possibly according to another deceleration pattern, and a zero steering angle is forced.

In step S43, vehicle 1 is parked in the parking space.

The first distance threshold value should be proportional to the position of the rear (first) obstacle, including a safety margin, so that the vehicle 1 does not come too close to this obstacle.

The second distance threshold value should be proportional to the size of the car space or the parking space.

During the parking maneuver, the steering angle can be controlled in an open or closed control circuit.

When the vehicle is parked in the parking space, it automatically switches the engine off and activates an electronic parking brake.

Figure 6:
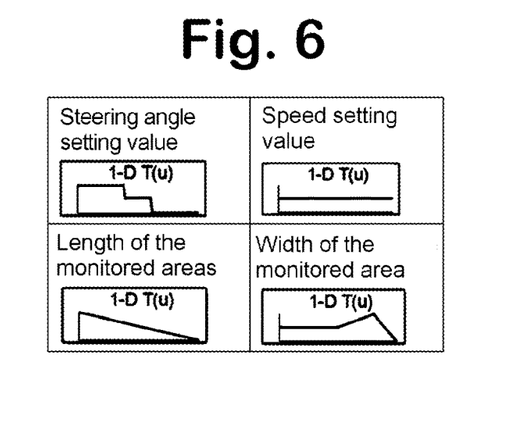
FIG. 6 shows examples of the forms of parameter setting values for carrying out the first maneuver of the PARKING mode.

FIG. 6 shows examples of the form of various parameter setting values used to perform the first maneuver of the PARKING mode. All parameters are specified in one or more lookup tables with respect to the distance D2 travelled.

Pause:

The PAUSE mode is entered in the following cases:
The vehicle's lateral controller is in a frozen state (an integrator is deactivated and is held, and it is determined that a steering angle output is held). The control inputs are stored in memory.
The longitudinal controller of the vehicle is reset (integrator reset to zero, all inputs/outputs reset to zero) and deactivated (no speed control). The control inputs are stored in memory.
The brake is forced, for example to provide 100% to keep the vehicle at a standstill.
The monitoring units remain active.

Leaving the PAUSE mode:
Activate the lateral controller and restore the inputs recorded in the memory.
Activate the longitudinal controller and restore the inputs recorded in the memory.
Release the brake.

Abort:

If the ABORT mode is entered, the vehicle is stopped, and the longitudinal controller is deactivated.

Execution of the ABORT mode means that the vehicle has started the first maneuver of the PARKING mode but is unable to use the parking space due to unexpected obstacles.

First, move the vehicle from the current position back to the position it took at the start of the PARKING mode, move the gear selector lever to the D position and reverse the parameters of the longitudinal and lateral controllers. Nothing special needs to be done, as the distance D2 automatically increases and thus the previous set of setting values applies. Continue until the distance D2 is approximately zero miles (corresponding to the starting position) close to the first obstacle. Deactivate all monitoring units and controllers and stop the vehicle.

Then automatically reactivate and return to the EXPLORE mode. This is done when leaving the ABORT mode.

After returning to the EXPLORE mode, the vehicle searches for the next free parking space.

From each of the aforementioned operating modes, the method transitions to a FAULT mode if there is any defect of the vehicle or the AVP system. In this case, the vehicle should brake immediately and deactivate all sensors and controllers. Moreover, it will or may warn other road users and warn the driver to contact a repair service and/or an emergency service.

The following transitions between the operating modes shown in FIG. 3 are possible under the following circumstances:

A0:
Vehicle started (ignition key rotated or start button pressed).

A1:
AVP system activated by the driver or by an infrastructure.

A2:
At least one parking space is available somewhere around the vehicle (i.e. within a certain radius around the vehicle).
The driver has selected a road scenario, or a road scenario has been called up from the infrastructure.
The driver has released all the actuators (pedals, steering) and put the gear selector lever in the P position.
The driver has left the vehicle, which can be verified using a logical combination of the following indicators:
  seat belt unstrapped;
  driver's door opens and closes within a certain period of time;
  a driver's seat occupancy detector reports an empty seat;
  an interior camera does not detect any passengers in the vehicle.
The steering angle of the wheel is at a certain value (for example zero) or close to it.

A3:
The vehicle has reached the condition "vehicle ready to start parking in the parking space" (S22) of the EXPLORE mode.

A4:
The vehicle has reached the "parked in the parking space" (S43) state of the PARKING mode, an electronic parking brake is activated, and the vehicle is switched off.

A5:
An obstacle that poses collision risks during the EXPLORE mode is detected by one of the vehicle's monitoring units and, in particular, monitoring units 6, 7 and 8. This trigger can be debounced to avoid frequent changes back and forth between PAUSE and EXPLORE.

A5':
No obstacle is detected by any of the vehicle's monitoring units and, in particular, monitoring units 6, 7 and 8.

A6:
An obstacle which poses collision risks during the PARKING mode is identified by one of the vehicle's monitoring units and in particular monitoring units 6, 7 and 8. This trigger can be debounced to avoid frequent changes back and forth between PAUSE and PARKING.

A6':
No obstacle is detected by any of the vehicle's monitoring units and, in particular, monitoring units 6, 7 and 8.

A7:
Optionally, if an obstacle is detected by one of the vehicle's monitoring units during the PARKING mode, the AVP system enters the ABORT mode.

Optionally, if an obstacle representing a threat (rapidly approaching the vehicle 1) is detected by one of the monitoring units of the vehicle 1, the AVP system enters the ABORT mode.

A8:
The AVP system is in the PAUSE mode for a certain period of time, and the AVP system has previously switched from PARKING to PAUSE, which means that the obstacle may permanently occupy the parking space.

A9:
When the vehicle is returned to its initial position by ABORT, the AVP system automatically reverts to EXPLORE.

A10:

Any fault state present (engine defect, brake defect, gearbox defect, etc.).

A method for performing automatic valet parking has been described, which has the following characteristics and advantages:

The method does not require any external (i.e. outside the vehicle) infrastructure or pre-recorded or guided paths to a car space or parking space to enable parking.

The method does not require physical monitoring by a person.

The method requires certain initial actions of the driver, but then runs automatically without the need for supervision by the person who handed the vehicle over to automatic valet parking.

The method is able to find a car space or a parking space, to park in it and monitor PAUSE, ABORT and FAULT scenarios. Moreover, the method can unpark the vehicle at the driver's request in a similar manner (with reversed setting values) as in the PARKING mode.

In the exemplary embodiment, the method includes all the operating modes START, EXPLORE, PARKING, PAUSE, ABORT and FAULT described above. However, the method includes at least the EXPLORE mode as described by means of FIGS. 4A and 4B and the PARKING mode as described in FIGS. SA and SB.

It can cope with all possible types of parking spaces, whether on a road, on a site or in a building, and the road or roadways leading to parking spaces can have any shape, especially including curves.

The method enables reproducible initial positioning in the EXPLORE mode, which simplifies trajectory planning.

The AVP system can be extended with additional control elements. Its perceptual capacity is ensured by monitoring units which constantly monitor all the points relating to vehicle movement during maneuvers where there is a risk of collision.

The driver of a vehicle who wants to hand the vehicle over to the AVP system must activate the AVP system via some dedicated human-machine interface. The AVP system must then notify the driver to release all control elements and monitor that the driver has done so. The AVP system must also notify the driver to select a road scenario (and for example to specify the parking area layout, the parking area scenario, etc.), and to monitor that the driver has done so. The AVP system must notify the driver to leave the vehicle and monitor that the driver has done so (for example by seat occupancy detection, closing or opening states of the vehicle door and seat belt lock, etc.

Preferably, at least four monitoring units 6, 7, 8, 9 are used to monitor different areas around the vehicle 1 and to obtain measurement data for the vehicle controllers.

Monitoring units 6, 7, 8, 9 each contain at least one monitoring sensor and thus monitor an associated area around the vehicle 1.

The different monitoring units 6, 7, 8, 9 can share the same physical sensors and may overlap in the areas monitored by the sensors.

Preferably, the monitoring units 6, 7, 8, 9 described above provide at least information or measurements indicating whether an obstacle is present in the areas monitored by them, as well as the distance to this obstacle, in particular as a longitudinal and/or lateral distance to this obstacle.

The invention claimed is:

1. A method for performing automatic valet parking (AVP) on and/or beside a roadway, the method comprising:

selecting, after activation by a driver of a motor vehicle, a road scenario applicable to the roadway from several pre-set scenarios or by the driver, wherein the pre-set scenarios include at least a parking space layouts longitudinal parking, vertical parking, and cross-parking;

checking whether the road scenario has been selected;

notifying the driver to release manual control elements of the motor vehicle and to leave the motor vehicle;

checking whether the control elements have been released and that the driver has left the motor vehicle;

if the control elements are released and the driver has left the motor vehicle, entering an EXPLORE mode in which the motor vehicle is slowly autonomously driven along the roadway by means of longitudinal and lateral controllers and searches for a free car space or a parking space using environment data from the vehicle's own environmental sensors;

when the free car space or parking space of sufficient size for the motor vehicle has been found, placing the motor vehicle in a parking position suitable for parking and to stop there; and when the motor vehicle has reached an appropriate position for parking, changing from the EXPLORE mode to a PARKING mode in which the motor vehicle is parked autonomously in the free car space or the parking space from the parking position by means of the longitudinal and lateral controllers and using the environmental data previously obtained by the environmental sensors in the EXPLORE mode and the environmental data continuously captured in the PARKING mode, wherein the motor vehicle is driven along the roadway in the EXPLORE mode first at a constant speed of 10 km/h and in other phases of the EXPLORE mode at lower speeds than 10 km/h.

2. The method according to claim 1, wherein the motor vehicle is driven autonomously along the roadway in the EXPLORE mode at a constant or gradually reduced speed.

3. The method according to claim 1, wherein the motor vehicle is driven at a lower speed in the PARKING mode than in the EXPLORE mode.

4. The method according to claim 3, wherein four areas around the motor vehicle are monitored by means of the environmental sensors, wherein sizes of the monitored areas are gradually decreased as the speed decreases.

5. The method according to claim 4, the four areas are a first area straight ahead of the motor vehicle, a second area to the front right or front left of the motor vehicle, a third area extending over the length of a whole side of the motor vehicle, and a fourth area extending over part of the length of a side of the motor vehicle and extending further to the side than the third area.

6. The method according to claim 5, the signals of the environmental sensors are evaluated by four monitoring units, each of which is assigned to one or more assigned areas of the four areas and obtains information from the signals as to whether or not there is an obstacle in the one or more assigned areas and how large the distance to this obstacle is.

7. The method according to claim 1, wherein the method is carried out without a parking assistance infrastructure located outside the motor vehicle on or beside the roadway and without prior knowledge of paths to the free car space or a parking space, and that at least the EXPLORE and PARKING modes are carried out without any supervision by a person.

8. The method according to claim 1, wherein under certain conditions the method enters a PAUSE mode or an ABORT mode from which the method can automatically return to the EXPLORE mode or the PARKING mode, and enters a FAULT mode from each of the above mentioned modes under certain conditions, wherein in the FAULT mode the motor vehicle immediately stops and at least the driver is notified.

9. A method for performing automatic valet parking (AVP) on and/or beside a roadway, the method comprising:
selecting, after activation by the driver of a motor vehicle, a road scenario applicable to the roadway from several pre-set scenarios or by the driver, wherein the pre-set scenarios include at least a parking space layouts longitudinal parking, vertical parking, and cross-parking;
checking whether a road scenario has been selected;
notifying the driver to release manual control elements of the motor vehicle and to leave the motor vehicle;
checking whether the control elements have been released and that the driver has left the motor vehicle;
if the control elements are released and the driver has left the motor vehicle, entering an EXPLORE mode in which the motor vehicle is slowly autonomously driven along the roadway by means of longitudinal and lateral controllers and searches for a free car space or a parking space using the vehicle's own environmental sensors;
when a free car space or parking space of sufficient size for the motor vehicle has been found, placing the motor vehicle in a parking position suitable for parking and to stop there; and when the motor vehicle has reached the appropriate position for parking, changing from the EXPLORE mode to a PARKING mode in which the motor vehicle is parked autonomously in the car space or the parking space from the parking position by means of the longitudinal and lateral controllers and using the environmental data previously obtained by the environmental sensors in the EXPLORE mode and the environmental data continuously captured in the PARKING mode, wherein the motor vehicle is driven at a lower speed in the PARKING mode than in the EXPLORE mode, wherein four areas around the motor vehicle are monitored by means of the environmental sensors, wherein sizes of the monitored areas are gradually decreased as the speed decreases.

10. A system comprising:
a processor; and
a memory for storing executable instructions, the processor configured to execute the instructions to:
select, after activation by a driver of a motor vehicle, a road scenario applicable to the roadway from several pre-set scenarios or by the driver, wherein the pre-set scenarios include at least a parking space layouts longitudinal parking, vertical parking, and cross-parking;
check whether the road scenario has been selected;
notify the driver to release manual control elements of the motor vehicle and to leave the motor vehicle;
check whether the control elements have been released and that the driver has left the motor vehicle;
if the control elements are released and the driver has left the motor vehicle, enter an EXPLORE mode in which the motor vehicle is slowly autonomously driven along the roadway by means of longitudinal and lateral controllers and searches for a free car space or a parking space using environment data from the vehicle's own environmental sensors;
when the free car space or parking space of sufficient size for the motor vehicle has been found, place the motor vehicle in a parking position suitable for parking and to stop there; and
when the motor vehicle has reached an appropriate position for parking, change from the EXPLORE mode to a PARKING mode in which the motor vehicle is parked autonomously in the free car space or the parking space from the parking position by means of the longitudinal and lateral controllers and using the environmental data previously obtained by the environmental sensors in the EXPLORE mode and the environmental data continuously captured in the PARKING mode, wherein the motor vehicle is driven along the roadway in the EXPLORE mode first at a constant speed of 10 km/h and in other phases of the EXPLORE mode at lower speeds than 10 km/h.

* * * * *